United States Patent [19]

Kaufmann

[11] Patent Number: 4,466,072

[45] **Date of Patent: * Aug. 14, 1984**

[54] AUTOMATIC FIXED-QUANTITY/FIXED-TIME ANTI-OXIDATION REPLENISHER CONTROL SYSTEM

[75] Inventor: Kenneth M. Kaufmann, Minneapolis, Minn.

[73] Assignee: Pako Corporation, Minneapolis, Minn.

[ * ] Notice: The portion of the term of this patent subsequent to Feb. 8, 2000 has been disclaimed.

[21] Appl. No.: 321,619

[22] Filed: Nov. 16, 1981

[51] Int. Cl.³ ........................ G03D 3/06; G05D 11/00

[52] U.S. Cl. ........................ 364/502; 137/93; 354/298

[58] Field of Search ................ 354/297, 298; 364/502; 137/93

[56] References Cited

U.S. PATENT DOCUMENTS

| | | | |
|---|---|---|---|
| 3,472,143 | 10/1969 | Hixon et al. | 95/89 |
| 3,529,529 | 9/1970 | Schumacher | 95/89 |
| 3,554,109 | 1/1971 | Street | 95/89 |
| 3,559,555 | 2/1971 | Street | 95/89 |
| 3,561,344 | 2/1971 | Frutiger | 95/89 |
| 3,696,728 | 10/1972 | Hope | 95/89 |
| 3,752,052 | 8/1973 | Hope et al. | 95/89 |
| 3,787,689 | 1/1973 | Fidelman | 250/219 |
| 3,822,723 | 7/1974 | Crowell et al. | 137/624.15 |
| 3,927,417 | 11/1975 | Kinoshita et al. | 354/298 |
| 3,990,088 | 11/1976 | Takita | 354/298 |
| 4,057,818 | 11/1977 | Gaskell et al. | 354/298 |
| 4,104,670 | 8/1978 | Charnley et al. | 354/324 |
| 4,119,952 | 10/1978 | Takahashi et al. | 340/309 |
| 4,128,325 | 12/1978 | Melander et al. | 354/298 |
| 4,134,663 | 1/1979 | Laar et al. | 354/298 |
| 4,174,169 | 11/1979 | Melander et al. | 354/324 |
| 4,372,665 | 2/1983 | Kaufmann | 354/298 |

OTHER PUBLICATIONS

Luth, *Elektronic-Film-Processor* 1200/48"*E*, *LT*600/24"*E*.

*Primary Examiner*—Joseph F. Ruggiero
*Assistant Examiner*—Allen MacDonald
*Attorney, Agent, or Firm*—Kinney & Lange

[57] ABSTRACT

A processor of photosensitive material includes an automatic control system for providing anti-oxidation replenishment, as a function of a stored anti-oxidation replenishment rate and anti-oxidation replenishment provided by exhaustion replenishment. A time interval of fixed duration is initiated, at the end of which the anti-oxidation replenishment required due to expired time is compared to the amount of anti-oxidation replenishment provided by the exhaustion replenishment in that time interval. If the amount of needed anti-oxidation replenishment reaches a preset value, a fixed amount of replenisher is added to the developer tank. If the amount of needed anti-oxidation replenishment is less than the preset value, no replenisher is added and all amounts continue to accumulate. The comparison is repeated at the end of successive time intervals.

7 Claims, 3 Drawing Figures

AUTOMATIC FIXED-QUANTITY/FIXED-TIME ANTI-OXIDATION REPLENISHER CONTROL SYSTEM

CROSS REFERENCE TO PATENTS AND COPENDING APPLICATIONS

Reference is hereby made to my patents entitled AUTOMATIC REPLENISHER CONTROL SYSTEM, U.S. Pat. No. 4,293,211, issued Oct. 6, 1981; AUTOMATIC ANTI-OXIDATION REPLENISHER CONTROL, U.S. Pat. No. 4,295,792, issued Oct. 20, 1981; AUTOMATIC FIXED-QUANTITY/VARIABLE-TIME ANTI-OXIDATION REPLENISHER CONTROL SYSTEM U.S. Pat. No. 4,422,152 issued Dec. 20, 1983; AUTOMATIC VARIABLE-QUANTITY/FIXED-TIME ANTI-OXIDATION REPLENISHER CONTROL SYSTEM U.S. Pat. No. 4,572,665 issued Feb. 8, 1983; and AUTOMATIC VARIABLE-QUANTITY/VARIABLE-TIME ANTI-OXIDATION REPLENISHER CONTROL SYSTEM, U.S. Pat. No. 4,372,666 issued Feb. 8, 1983.

BACKGROUND OF THE INVENTION

1. Field of the Invention

The present invention relates to an automatic anti-oxidation replenisher control system for use in processors of photosensitive material.

2. Description of the Prior Art

Automatic photographic film and paper processors transport sheets or webs of photographic film or paper through a sequence of processor tanks in which the photosensitive material is developed, fixed, and washed, and then transport the material through a dryer. It is well known that photographic processors require replenishment of the processing fluids to compensate for changes in the chemical activity of the fluids.

First, it has been recognized that replenishment is necessary to replace constituents used as photosensitive film or paper is developed in the processor. This replenishment is "use related" or "exhaustion" chemical replenishment. Both developer and fix solutions require exhaustion replenishment.

Second, chemical activity of the developer solution due to aerial oxidation occurs with the passage of time regardless of whether film or paper is being processed. Replenishment systems provide additional replenishment of an "anti-oxidation" (A-O) replenishment solution which counteracts this deterioration.

Replenishment systems were originally manually operated. The operator would visually inspect the processed film or paper and manually operate a replenishment system as he deemed necessary. The accuracy of the manual replenishment systems was obviously dependent upon the skill and experience of the operator.

Various automatic replenishment systems have been developed for providing use-related replenishment. Examples of these automatic replenishment systems include U.S. Pat. No. 3,472,143 by Hixon et al.; U.S. Pat. No. 3,529,529 by Schumacher; U.S. Pat. No. 3,554,109 by Street et al.; U.S. Pat. No. 3,559,555 by Street; U.S. Pat. No. 3,561,344 by Frutiger et al.; U.S. Pat. No. 3,696,728 by Hope; U.S. Pat. No. 3,752,052 by Hope et al.; U.S. Pat. No. 3,787,689 by Fidelman; U.S. Pat. No. 3,927,417 by Kinoshita et al.; U.S. Pat. No. 3,990,088 by Takita; U.S. Pat. No. 4,057,818 by Gaskell et al.; U.S. Pat. No. 4,104,670 by Charnley et al.; U.S. Pat. No. 4,119,952 by Takahashi et al.; U.S. Pat. No. 4,128,325 by Melander et al.; and U.S. Pat. No. 4,134,663 by Laar et al.

Examples of prior art replenisher controls for providing both exhaustion and anti-oxidation replenishment are shown in U.S. Pat. No. Re. 30,123 by Crowell et al. and U.S. Pat. No. 4,174,169 by Melander et al. In particular, these patents show systems which are usable to control anti-oxidation replenishment when a type of anti-oxidation replenishment known as "blender chemistry" is used. Blender chemistry is based upon a "minimum daily requirement" of anti-oxidation replenishment. This minimum daily requirement is dependent upon the amount of aerial oxidation which occurs in the developer tank, which in turn is dependent upon the open surface area of the tank, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

Crowell discloses a variable quantity, fixed time anti-oxidation replenishment control in which a variable amount of anti-oxidation replenishment needed due to aging is determined at fixed time intervals based upon the replenishment provided by use or exhaustion replenishment during the time interval. At fixed time intervals, a needed amount of anti-oxidation replenishment is added, which varies from zero up to a predetermined maximum amount. The more exhaustion replenishment provided during the time interval, the less anti-oxidation replenishment is required. The apparatus in Crowell does not consider, however, the situation where more anti-oxidation replenishment than is needed is provided by the exhaustion replenishment. Thus overage can lead to an accumulated error in the Crowell system.

Overreplenishment of anti-oxidation fluid will produce incorrect processing results, just as will underreplenishment. There is no recognition in Crowell that this error accumulation can occur, or of any way to resolve it. In addition, the system of Crowell et al. is limited by its use of analog electronics and electromechanical cams, which make the system difficult to calibrate and limit the number of control options available to the user.

Melander et al. discloses a fixed quantity, variable time anti-oxidation system based on a counter which is set to a predetermined value and then counted down over time to measure oxidation of processor fluid. When the counter reaches zero, a fixed amount of anti-oxidation replenisher is added. The counter is counted up to reflect anti-oxidation replenishment provided as a result of exhaustion replenishment.

SUMMARY OF THE INVENTION

The automatic control system of the present invention is a fixed quantity, fixed time anti-oxidation replenishment control system which establishes an amount of needed anti-oxidation replenishment fluid and selectively adds or does not add a fixed amount of anti-oxidation replenishment fluid to the developer tank at fixed time intervals. A fixed time interval is initiated and measured by a clock means. The amount of anti-oxidation replenishment provided as a result of the exhaustion replenishment is used to provide a first replenishment signal. A stored anti-oxidation replenishment rate and the measured time are used to provide a second replenishment signal indicative of how much anti-oxidation replenishment is needed. The two signals are compared at the end of the interval. If the difference between the signals is equal to or greater than a preset value, the fixed amount of anti-oxidation replenishment is supplied to the developer tank. If the difference between the signals is less than the preset value, no anti-oxidation replenishment is added. In one embodiment, if no anti-oxidation replenishment is added, the difference is saved and used to determine needed anti-oxidation replenishment in a subsequent interval. Another fixed time interval is then started.

DETAILED DESCRIPTION OF THE PREFERRED EMBODIMENTS

Figure 1:
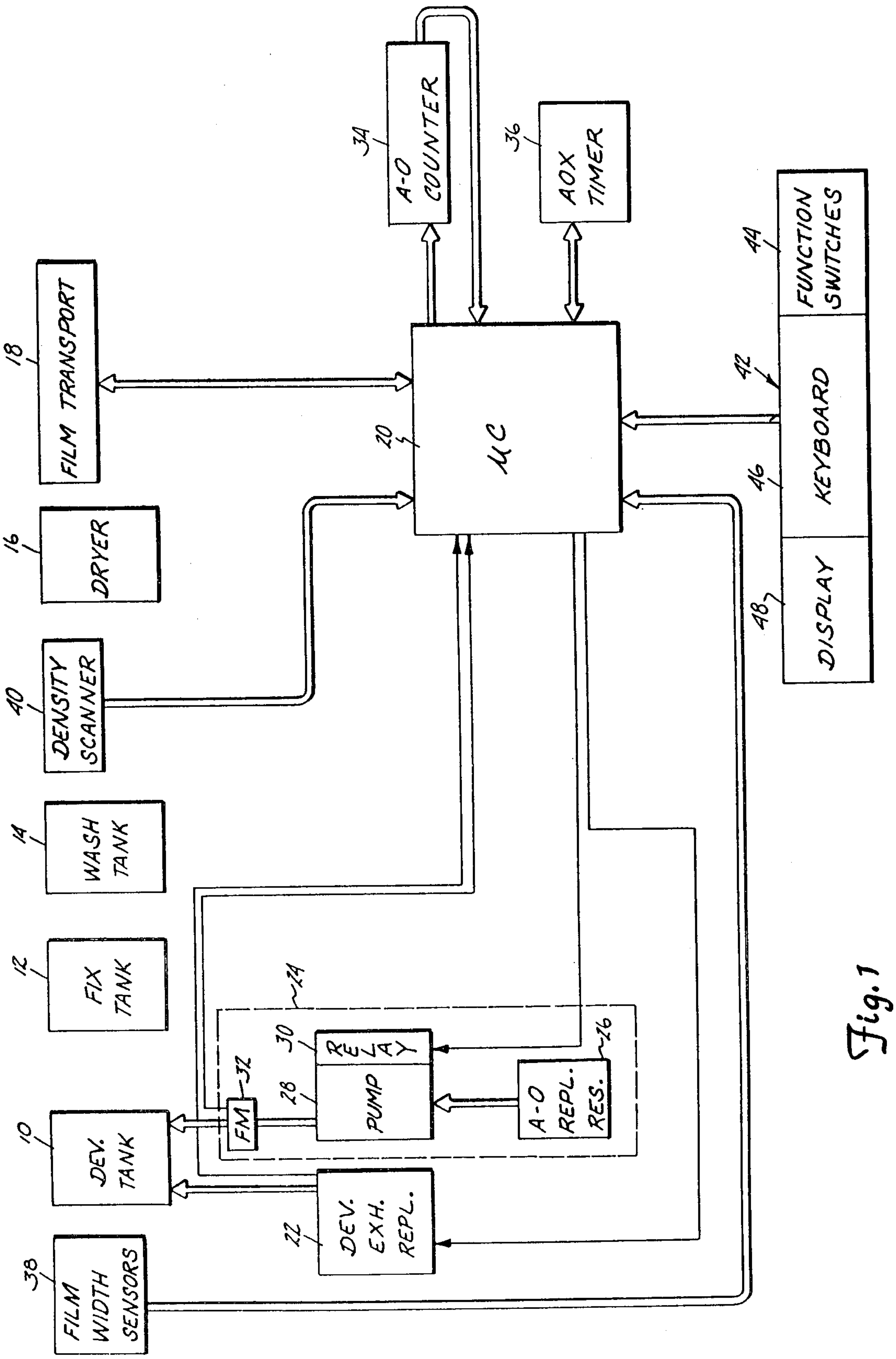
FIG. 1 is a block diagram illustrating a processor including a preferred embodiment of the automatic anti-oxidation replenishment control system of the present invention which uses a pump to deliver a fixed amount of anti-oxidation replenishment fluid.

In the system shown in FIG. 1, a photographic processor includes developer tank 10, fix tank 12, wash tank 14, and dryer 16. Film transport drive 18 transports a strip or web of photosensitive material (either film or paper) through tanks 10, 12, 14 and dryer 16. Microcomputer 20 controls operation of film transport 18 and of the automatic replenishment of fluids to tanks 10, 12 and 14.

The automatic replenishment system shown in FIG. 1 includes developer exhaustion replenisher 22 and anti-oxidation replenisher 24 for providing exhaustion and anti-oxidation replenishment, respectively, to developer tank 10. Microcomputer 20 controls operation of developer replenisher 22 and receives a feedback signal indicating operation of developer replenisher 22. Although, in a typical processor, fix and wash replenishment also are provided, these functions are not a part of the present invention, and therefore are not shown or discussed herein.

Anti-oxidation replenisher 24 includes anti-oxidation (A-O) replenisher reservoir 26, pump 28, pump relay 30, and flow meter or switch 32. Anti-oxidation replenishment is supplied from A-O replenisher reservoir 26 to developer tank 10 by pump 28, which is controlled by microcomputer 20 by means of relay 30. Flow meter or switch 32 monitors flow of A-O replenishment to developer tank 10 and provides a feedback signal to microcomputer 20.

Microcomputer 20 utilizes A-O counter 34 as a timer to control anti-oxidation replenishment. When anti-oxidation replenishment is required, microcomputer 20 loads a numerical value (AOXTIME) into A-O counter 34, which then begins counting. Microcomputer 20 energizes relay 30, which activates pump 28. When developer counter 34 reaches a predetermined value (such as zero), it provides an interrupt signal to microcomputer 20, which deenergizes relay 30. The numerical value (AOXTIME), therefore, determines the total amount of anti-oxidation replenisher fluid pumped into tank 10.

AOX timer 36 is a free running resettable timer which initiates and records a fixed time interval. As described later, this time interval is used by microcomputer 20 in the control of anti-oxidation replenishment.

Microcomputer 20 receives signals from film width sensors 38 and density scanner 40. Film width sensors 38 are positioned at the input throat of the processor, and provide signals indicating the width of the strip of photosensitive material as it is fed into the processor. Since microcomputer 20 also controls film transport 18, and receives feedback signals from film transport 18, the width signals from film width sensors 38 and the feedback signals from film transport 18 provide an indication of the area of photosensitive material being processed.

Density scanner 40 senses density of the processed photosensitive material. The signals from density scanner 40 provide an indication of the integrated density of the processed photosensitive material. The integrated density, together with the area of material processed, provides an indication of the amount of processor fluids used or exhausted in processing that material.

Microcomputer 20 also receives signals from control panel 42, which includes function switches 44, keyboard 46, and display 48. Function switches 44 select certain functions and operating modes of the processor. Keyboard 46 permits the operator to enter numerical information, and other control signals used by microcomputer 20 in controlling operation of the processor, including the replenishment function. Display 48 displays messages or numerical values in response to control signals from microcomputer 20.

Microcomputer 20 preferably stores set values for each of a plurality of photosensitive materials that may be processed in the processor. Each group of set values includes a pump rate for pump 28 (AOXPMPRTE), and the desired replenishment rate of anti-oxidation replenishment (AOXRT).

When operation is commenced, the operator selects (through control panel 42) one of the groups of set values which corresponds to the particular photosensitive material being processed. As the leading edge of each strip of photosensitive material is fed into the processor, film width sensors 38 sense the presence of the strip, and provide a signal indicative of the width of the strip being fed into the processor. Width sensors 38 continue to provide the signal indicative of the width of the strip until the trailing edge of the strip passes sensors 38. The length of time between the leading and trailing edges of the material passing sensors 38, and the transport speed of the material (which is controlled by microcomputer 20 through film transport 18) provide an indication of the length of the strip. The width and length information for each strip is stored until the strip has been transported through the processor and reaches density scanner 40. The area of the strip and the integrated density of the strip (which is provided by the signals from density scanner 40), provide an indication of the amount of developer which has been exhausted in processing that particular strip.

As discussed previously, the present invention relates to the type of an anti-oxidation replenishment known as "blender chemistry". Blender chemistry is based upon a "minimum daily requirement" of anti-oxidation replenishment. This minimum daily requirement is dependent upon the amount of aerial oxidation which occurs in developer tank 10, which in turn is dependent upon the open surface area of tank 10, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

A first preferred embodiment of the anti-oxidation replenishment control system of the present invention, as shown in FIG. 1, uses pump 28 to transfer a predetermined fixed amount of anti-oxidation replenisher from anti-oxidation replenisher reservoir 26 to developer tank 10. A-O counter 34 is used to measure the amount of time that pump 28 will run, so that the correct amount is transferred to developer tank 10. When microcomputer 20 activates relay 30 to start pump 28, A-O counter 34 begins timing. When a fixed amount of anti-oxidation fluid has been transferred, pump 28 is stopped. Flow meter or switch 32 provides to microcomputer 20 a feedback signal indicating that anti-oxidation replenisher fluid has been provided to developer tank 10.

The supplying of anti-oxidation replenisher fluid to the processer using the system of the present invention is generally as follows. AOX timer 36 initiates a time interval of fixed duration. During this time interval, exhaustion replenishment is provided, as needed, by exhaustion replenisher 22. This is done, as discussed above, as a function of the use of the developer fluid in tank 10. The use is indicated by the signals from film width sensors 38, density scanner 40, and film transport 18. Microcomputer 20 determines and stores the accumulated amount of anti-oxidation (AOXDEV) replenishment supplied as a result of that exhaustion replenishment during the time since the last anti-oxidation replenishment. At the end of the fixed-length time interval, AOX timer 36 provides a clock interrupt to microcomputer 20. Microcomputer 20 uses a stored anti-oxidation replenishment rate (AOXRT) and the time expired in the time interval (AOXTM), as measured by AOX timer 36, to determine a second signal (AOXRT×AOXTM) which indicates the amount of anti-oxidation replenishment required since the last anti-oxidation replenishment. Microcomputer 20 then compares the first signal (AOXDEV) indicating the accumulated amount of anti-oxidation replenishment supplied in the interval as a result of the exhaustion replenishment with the second signal (AOXRT×AOXTM) indicating anti-oxidation replenishment required at the current time in the interval. A value (AOXREPL) is preset in microcomputer 20 representing the fixed amount of anti-oxidation replenisher to be supplied to developer tank 10. If the first signal is greater than the second signal, no anti-oxidation replenishment is required and the microcomputer 20 goes on with its normal operating steps. If the second signal is greater than the first signal and the difference between the two signals equals or exceeds the preset value (AOXREL), the microcomputer 20 activates anti-oxidation replenisher 24 to provide a fixed amount of anti-oxidation replenisher to developer tank 10. If the difference exceeds AOXREPL, the amount needed but not supplied is carried over (AOXCARRY) to be added into the amount needed at the next clock interrupt from AOX timer 36.

If the difference is less than the preset value, no anti-oxidation replenishment is added and the microcomputer 20 goes on with its normal operating steps.

Table 1 illustrates how microcomputer 20 determines and controls anti-oxidation replenishment in accordance with the first embodiment of the present invention which uses pump 28 to supply anti-oxidation replenishment. In Table 1, AOXREPL is a fixed quantity of anti-oxidation replenishment fluid. AOXTM is the time since the last anti-oxidation replenishment. AOXDEV is accumulated anti-oxidation replenishment provided as a result of exhaustion replenishment.

At the end of each fixed time interval, microcomputer 20 performs the process listed in Table 1:

TABLE 1

| | |
|---|---|
| 1.1 | The anti-ox timer 36 times out (e.g. 22.5 minutes) |
| 1.2 | AOXNED = (AOXRT × AOXTM) − AOXDEV + AOXCARRY |
| 1.3 | If AOXNED is less than AOXREPL go to 1.1<br>Else<br>(a) AOXCARRY = AOXNED − AOXREPL<br>(b) reset AOXDEV<br>(c) Reset AOXTM |
| 1.4 | Output fixed time to counter 34 |
| 1.5 | Trigger pulse sent to counter 34 and<br>(a) Replenish flag (AOX) set |
| 1.6 | Counter 34 begins decrementing and<br>(a) Anti-ox replenishment pump 28 runs<br>(b) When counter 34 times out, go to 1.9 |
| 1.7 | If flow switch 32 does not activate and/or Anti-ox replenishment pump relay 30 does not energize then ERROR |
| 1.8 | If pump enable is turned off while counter 34 is running then<br>(a) Wait 5 seconds<br>(b) If change then resume 1.8<br>Else<br>(a) Read value remaining in counter 34 to AOXREM<br>(b) Clear counter 34<br>(c) Replenish flag (AOX) reset<br>(d) Reset AOX timer and exit |
| 1.9 | Counter 34 times out and<br>(a) Interrupt request generated |
| 1.10 | If interrupt request not acknowledged then wait;<br>Else |
| 1.11 | If flow switch 32 remains activated and/or pump relay 30 remains energized then ERROR;<br>Else |
| 1.12 | Reset replenish (AOX) flag and AOX not-complete flag |

Figure 2:
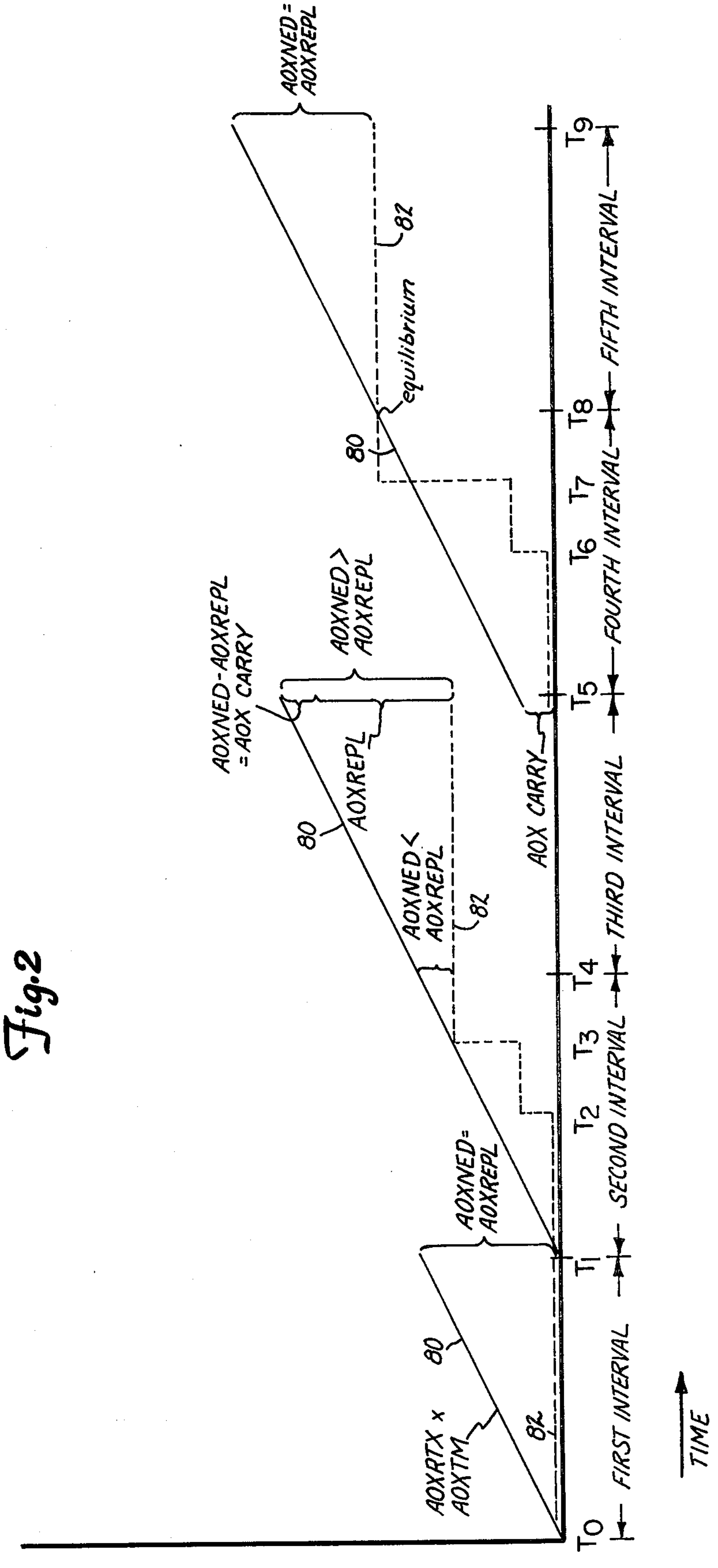
FIG. 2 is a graph illustrating the operation of one preferred embodiment of the system of the present invention.

FIG. 2 is a graphic representation of how anti-oxidation replenishment occurs under the process shown in Table 1 and illustrates the operation of the control system of the present invention. The horizontal axis of the graph shows increments of time. Slanted curve 80 shows the need for anti-oxidation replenishment due to oxidation over time, which is determined by multiplying the anti-oxidation rate (AOXRT) times the expired time since the last replenishment (AOXTM). Dashed curve 82 represents anti-oxidation replenishment provided as a result of exhaustion replenishment. At any point along the time line, the vertical distance between the two curves 80 and 82 represents the replenishment state of the processor. If the dashed curve 82 is below the slanted curve 80, the system is underreplenished. If the dashed curve 82 is over the slanted curve 80, the system is overreplenished.

In the example shown in FIG. 2, a first fixed time interval is initialized at time $T_0$. Fixed time intervals are marked on the time line and end at times $T_1$, $T_4$, $T_5$, $T_8$, $T_{10}$, and $T_{14}$.

During the first fixed time interval from time $T_0$ to time $T_1$, no exhaustion replenishment occurs and therefore curve 82 is flat. At the end of that first interval, the difference between the need for replenishment due to oxidation (AOXRT×AOXTM) and the anti-oxidation provided by exhaustion replenishment (AOXDEV) equals the predetermined amount (AOXREPL). In this graph, that vertical distance represents an amount of replenishment equal to AOXREPL (AOXNED=AOXREPL). This is the amount needed during each period when no replenishment is provided by exhaustion replenisher 22.

The second fixed time interval extends from time $T_1$ to time $T_4$. During this interval, exhaustion replenishment occurs at times $T_2$ and $T_3$. At time $T_3$, curves 80 and 82 intersect. At this point, the system is exactly in replenishment equilibrium. At time $T_4$, at the end of the second interval, the difference between the two curves (AOXNED) is less than AOXREPL so no replenishment occurs at time $T_4$. The parameters are not reset and calculations continue. The third interval extends from $T_4$ to $T_5$. During this third interval, no exhaustion replenishment occurs. At $T_5$ (the end of the third interval), the difference between the two lines (AOXNED) is greater than AOXREPL. Therefore, an amount of replenisher equal to AOXREPL is added.

The difference between the two curves (AOXNED) at time $T_5$ is slightly larger than AOXREPL. This small amount of underreplenishment is stored in AOXCARRY. AOXCARRY is used in determining the needed replenishment in the next time interval. At time $T_5$, rather than resetting the curve 80 to zero, the stored amount of underreplenishment (AOXCARRY) is taken into account and the line is started at a higher value. During the fourth time interval from time $T_5$ to time $T_8$, exhaustion replenishment occurs at $T_6$ and $T_7$. At time $T_8$, the system is exactly in balance with no difference between the two lines. Therefore, no anti-oxidation replenishment occurs. In the interval from time $T_8$ to time $T_9$ no exhaustion replenishment occurs. This results in a difference between the two lines which is exactly equal to AOXREPL at $T_9$. At this point, anti-oxidation replenishment occurs and all values are reinitialized.

The embodiment shown in FIG. 1, in which anti-oxidation replenishment is pumped from reservoir 26, is preferred in processors where anti-oxidation reservoir 26 must be located below developer tank 10 (which prevents the use of gravity feed). In graphic arts processors, for example, reservoirs are typically kept below the tanks. In this environment, only a pump system can be used. The delivery of a fixed quantity of anti-oxidation replenishment is advantageous, since pump 28 is not required to have high accuracy over a wide range of varying volumes to be delivered. Instead, a fixed volume is delivered by pump 28 each time replenishment is required.

Figure 3:
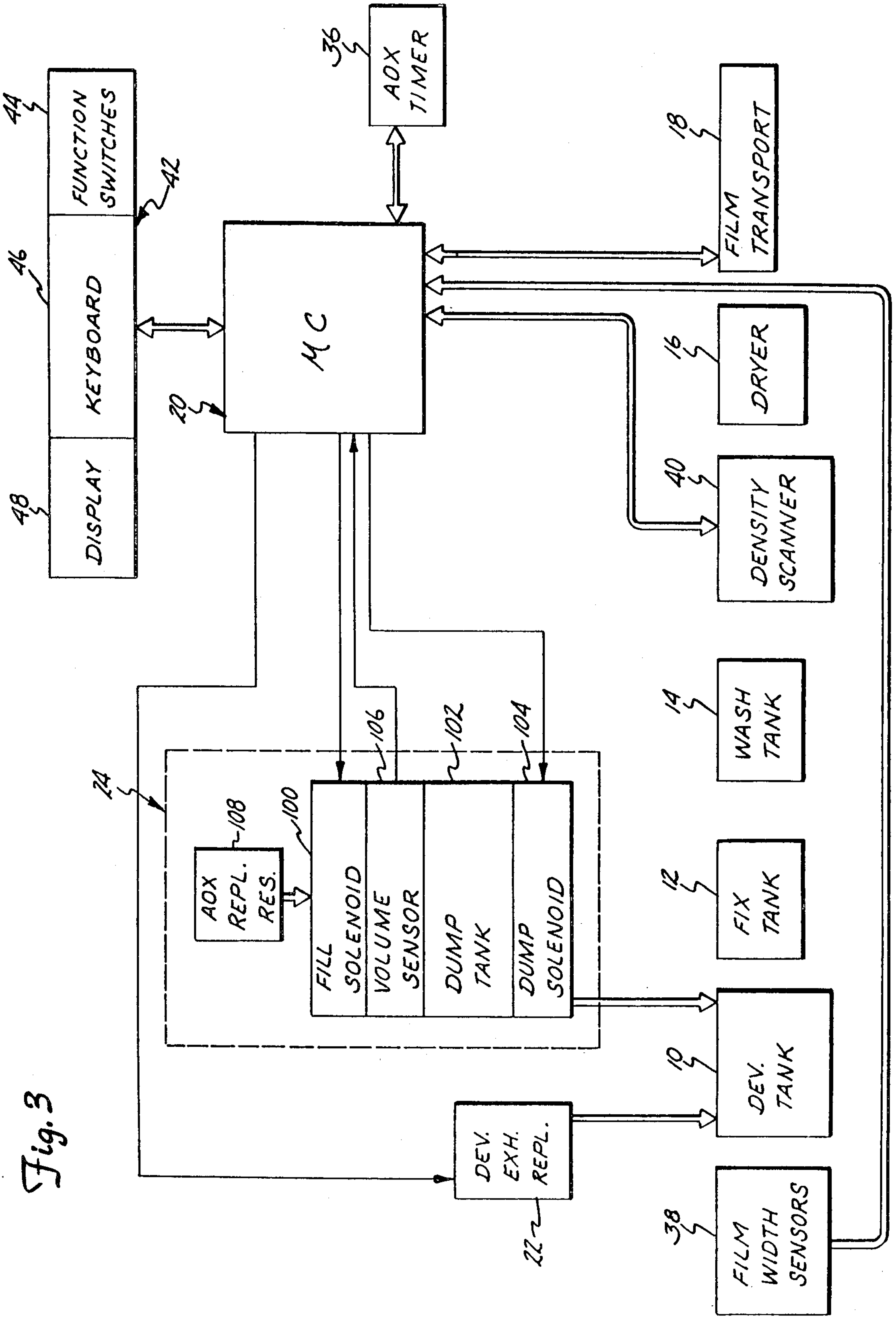
FIG. 3 is a block diagram of an alternate preferred embodiment, which employs a fill/dump apparatus to deliver a fixed amount of anti-oxidation replenishment fluid.

Another embodiment for providing the fixed quantity of anti-oxidation replenishment is shown in FIG. 3. The embodiment shown in FIG. 3 is generally similar to the embodiment shown in FIG. 1, and similar reference characters are used to designate similar elements. Here, anti-oxidation replenisher 24 includes fill solenoid 100, dump tank 102, dump solenoid 104, volume sensor 106 and anti-oxidation replenisher reservoir 108. Dump tank 102 holds a fixed quantity of anti-oxidation replenisher fluid. In this "fill-and-dump" embodiment, anti-oxidation replenisher reservoir 108 must be above dump tank 102 and, in turn, dump tank 102 must be above developer tank 10 so that gravity feed of the replenisher fluid is achieved. When it is time to provide anti-oxidation replenisher to developer tank 10, microcomputer 20 activates dump solenoid 104, so that the contents of dump tank 102 flow down into developer tank 10. When dump tank 102 is empty, microcomputer 20 deactivates dump solenoid 104 and then activates fill solenoid 106 which allows a fixed quantity of anti-oxidation replenisher to gravity fill from the reservoir 108 into dump tank 102.

Dump tank 102 has volume sensor means 106 to determine when dump tank 102 contains the predetermined amount of replenisher fluid. This volume sensor 106 is, for example, a float valve which senses the fluid level and causes deactivation of the fill solenoid 100 when the predetermined amount of fluid is present.

In one preferred embodiment, the dump tank 102 is adapted to hold on volume equal to 1/16th of the normal daily requirement of anti-oxidation replenisher fluid.

Each time that the microcomputer 20 determines that anti-oxidation replenishment is required, microcomputer 20 actuates dump solenoid 104, which permits the contents of dump tank 102 to be dumped by gravity feed into developer tank 10.

The embodiment of FIG. 3, using dump tank 102, is preferred in processors where anti-oxidation replenisher reservoir 28 is above the developer tank, so that gravity feed is possible. The embodiment of FIG. 3 offers cost advantages since a pump is not needed.

Table 2 describes the process followed by microcomputer 20 in the embodiment shown in FIG. 3. The labels have the same definitions as in Table 1.

TABLE 2

| | |
|---|---|
| 2.1 | The anti-ox timer times out (e.g. 22.5 minutes) |
| 2.2 | AOXNED = (AOXRT × AOXTM) − AOXDEV + AOXCARRY |
| 2.3 | If AOXNED is less than AOXREPL<br>go to 2.1<br>Else<br>(a) AOXCARRY = AOXNED − AOXREPL<br>(b) Else reset AOXDEV<br>(c) Reset AOXTM |
| 2.4 | Activate dump solenoid 104 |
| 2.5 | When dump tank 102 is empty<br>deactivate dump solenoid 104 |
| 2.6 | Activate fill solenoid 106 |

In conclusion, the fixed time, fixed quantity anti-oxidation replenishment control system of the present invention provides the flexibility for use in a wide range of processors. In those processers using replenishment pumps, it does not require precision pumps, or exact controls on pump pressure or flow at the pump head, since a fixed quantity of anti-oxidation replenishment fluid is always delivered. In addition, the present invention is equally applicable to fill-and-dump type systems.

Although the present invention has been described with reference to preferred embodiments, workers skilled in the art will recognize that changes may be made in form and detail without departing from the spirit and scope of the invention.

What is claimed is:

1. A method of controlling anti-oxidation replenishment in a processor of photosensitive material, the method comprising:

(a) initiating a time interval of predetermined duration;

(b) providing exhaustion replenishment during the time interval as a function of use of processor fluid;

(c) providing a first replenishment signal indicative of an accumulated amount of anti-oxidation replenishment supplied as a result of the exhaustion replenishment during the time interval;

(d) providing a second replenishment signal indicative of an amount of anti-oxidation replenishment required during the time interval as a function of a stored anti-oxidation replenishment rate;

(e) comparing the first and second replenishment signals at the end of the time interval;

(f) providing a predetermined amount of anti-oxidation replenishment at the end of the time interval if a difference by which the second replenishment signal is greater than the first replenishment signal exceeds a preset value, and providing no anti-oxidation replenishment at the end of the interval if the second replenishment signal exceeds the first replenishment signal by less than the preset value; and (g) initiating another time interval in which steps (b)-(g) are repeated.

2. The method of claim 1 further comprising:

(f1) storing a third signal indicative of the amount of anti-oxidation replenishment required during the interval if replenishment is not provided; and (f2) including in the second replenishment signal the amount of anti-oxidation replenishment required as indicated by the third signal.

3. The method of claim 1 wherein the first and second replenishment signals are digital signals.

4. A control system for controlling anti-oxidation replenisher means to provide anti-oxidation replenisher to a processor of photosensitive material, the control system comprising:

means for measuring a time interval of predetermined duration and providing a clock signal at the end of the interval;

means for storing an exhaustion replenishment rate;

means for storing an anti-oxidation replenishment rate;

means for providing a signal indicative of use of processor fluid;

means for providing exhaustion replenishment during the time interval as a function of the signal indicative of use of processor fluid and the exhaustion replenishment rate;

means for providing a first replenishment signal indicative of an accumulated amount of anti-oxidation replenishment supplied as a result of the exhaustion replenishment during the time interval;

means for providing a second replenishment signal indicative of an amount of anti-oxidation replenishment required during the time interval as a function of expired time since a last provision of anti-oxidation replenishment and the stored anti-oxidation replenishment rate;

means responsive to the clock signal for comparing the first replenishment signal and the second replenishment signal at the end of the time interval;

means for providing a predetermined amount of anti-oxidation replenishment if the difference by which the second replenishment signal exceeds the first replenishment signal is equal to or greater than a preset value, and providing no anti-oxidation replenishment if the second replenishment signal exceeds the first replenishment signal by less than the preset value.

5. The apparatus of claim 4, and further comprising:

means for storing a third signal indicative of the anti-oxidation replenishment required at the end of an interval if replenishment does not occur; and wherein the means for providing second replenishment signal uses the third signal in determining the value of the second replenishment signal.

6. The apparatus of claim 4 wherein:

the first and second replenishment signals are digital signals;

the anti-oxidation replenishment rate and exhaustion replenishment rate are stored as digital data; and the means for comparing the first and second replenishment signals is a programmed digital computer.

7. A computer-based control system for controlling anti-oxidation replenisher means for providing anti-oxidation replenishment to a processor of photosensitive material, the control system comprising:

clock means for measuring a predetermined time interval and providing a clock signal at the end of the interval;

exhaustion replenishment means responsive to a first replenishment signal for providing exhaustion replenishment;

means for providing a signal indicative of use of processor fluid;

anti-oxidation replenishment means responsive to a second replenishment signal for providing a predetermined amount of anti-oxidation replenishment; and programmed digital computer means for: storing a digital valve representing an exhaustion replenishment rate; receiving the signal indicative of use of processor fluid; receiving the clock signal from the clock means; storing a digital value representing an anti-oxidation replenishment rate; providing the first replenishment signal to the exhaustion replenishment means as a function of the use of processor fluid and the value representing the exhaustion replenishment rate; providing a first digital replenishment value indicative of an accumulated amount of anti-oxidation replenishment provided by exhaustion replenishment during the time interval; providing a second digital replenishment value indicative of the anti-oxidation replenishment needed as a function of the stored value representing the anti-oxidation replenishment rate and expired time since the last anti-oxidation replenishment by the anti-oxidation replenishment means; comparing the first replenishment value with the second replenishment value at the end of the time interval in response to the clock signal; providing the second replenishment signal to the anti-oxidation replenishment means if the second replenishment value exceeds the first replenishment value by at least a preset value; providing no anti-oxidation replenishment if the second replenishment value exceeds the first replenishment value by less than the present value; and resetting the clock means to reinitiate the interval.

* * * * *